United States Patent [19]
Fein et al.

[11] 3,795,873
[45] Mar. 5, 1974

[54] MULTICHANNEL NOISE SIMULATOR

[75] Inventors: Maier O. Fein, East Lyme; Roy A. Hilt, Uncasville, both of Conn.

[73] Assignee: The United States of America as represented by the Secretary of the Navy, Washington, D.C.

[22] Filed: Feb. 1, 1973

[21] Appl. No.: 328,573

[52] U.S. Cl............ 331/78, 331/60, 340/5, 340/384 E
[51] Int. Cl. ............................................ H03b 29/00
[58] Field of Search ..... 331/78, 60; 340/5, 6, 384 E

[56] References Cited
UNITED STATES PATENTS

| | | | |
|---|---|---|---|
| 2,974,198 | 3/1961 | McLeod | 331/78 X |
| 3,311,868 | 3/1967 | Cupp et al. | 331/78 X |

Primary Examiner—Herman Karl Saalbach
Assistant Examiner—Siegfried H. Grimm
Attorney, Agent, or Firm—Richard S. Sciascia; Arthur A. McGill; Prithvi C. Lall

[57] ABSTRACT

A multichannel noise simulator having a variable interchannel correlation approximates the noise found at the output of an array of hydrophones. The simulator can be adjusted to control interchannel correlation to simulate a real array noise which can vary from being completely uncorrelated to highly correlated. The output of a band limited noise source is switched sequentially from one output line to the next at a fixed sample rate. Since the sample rate has a correlation proportional to the reciprocal of the bandwidth, the correlation is varied by varying the bandwidth of the input noise. The change of sample rate thus permits the noise in various channels of the multichannel simulator to range from uncorrelated to highly correlated.

4 Claims, 2 Drawing Figures ial simulator of this invention is shown. The
MULTICHANNEL NOISE SIMULATOR

STATEMENT OF GOVERNMENT INTEREST

The invention decribed herein may be manufactured and used by or for the Government of the United States of America for governmental purposes without the payment of any royalties thereon or therefor.

BACKGROUND OF THE INVENTION

This invention relates to a noise simulator and more particularly to a multichannel noise simulator with variable interchannel correlation to simulate the noise of an array of hydrophones.

Multichannel noise sources of the prior art consist of a number of independent noise sources which are used to simulate the noise of an array of hydrophones. The uncorrelated noise from each independent noise source is fed through a separate output line. For partially uncorrelated noise simulation the outputs of several independent noise sources are summed. However, this method only allows simulation of noise for fixed value of correlation between different channels and provides only a limited number of channels, and does not provide a noise simulator wherein a single noise source is used to produce noise having variable interchannel correlation, nor a multichannel noise simulator of any number of channels having any value of correlation between the outputs of various channels.

SUMMARY OF THE INVENTION

The noise simulator of the present invention is an electronic circuit wherein the output of a band limited noise source is switched sequentially from one output line to the next by means of a plurality of switches wherein the sequential switching is accomplished at a fixed rate. Since the switching rate has a correlation proportional to the reciprocal of the bandwidth, the correlation is varied by varying the bandwidth of the input noise and thus changing the correlation of outputs between different channels of the noise simulator.

One object of this invention is to provide a multichannel noise simulator wherein interchannel correlation is continuously variable.

Another object of this invention is to provide a multichannel noise simulator having variable interchannel correlation which uses a single noise source.

Still another object of this invention is to provide a multichannel noise simulator to simulate the noise of an array of hydrophones.

Other objects, advantages and novel features of this invention will become apparent from the following detailed description of the invention when considered in conjunction with the accompanying drawings wherein:

DESCRIPTION OF A PREFERRED EMBODIMENT

Figure 1:
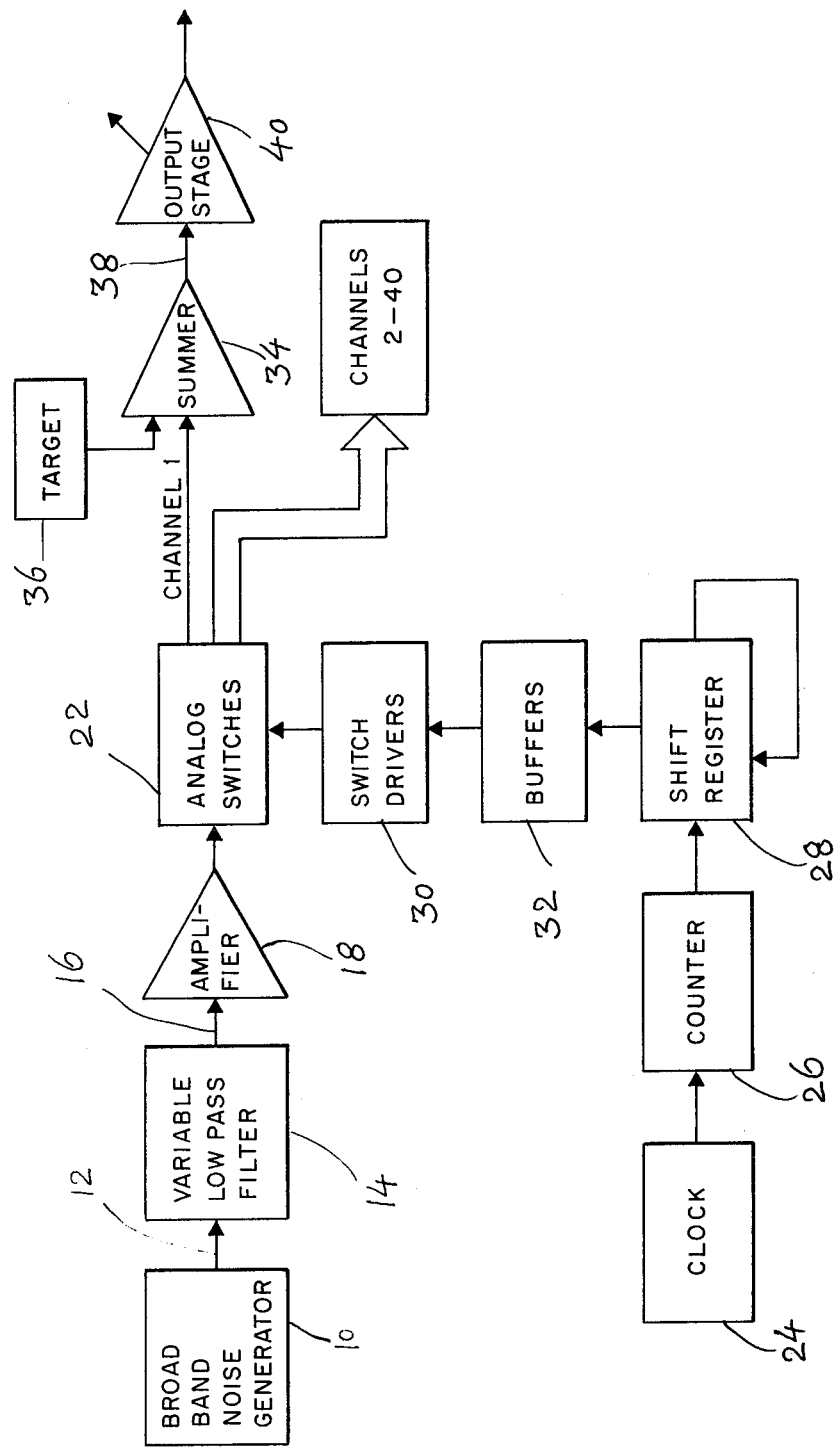
FIG. 1 is a block diagram of a multichannel noise simulator which is an embodiment of the present invention.

Referring to the drawings wherein like reference characters designate like parts throughout, and more particularly to FIG. 1 thereof, a block diagram of a multichannel simulator of this invention is shown. The output of a broad band noise generator 10 is shown by arrow 12 which is used as an input for a variable low band pass filter represented by block 14. The output of the variable low band pass filter is shown by arrow 16 which is used as an input to a wide band amplifier 18. The output of amplifier 18 is shown by arrow 20, which is fed sequentially to a plurality of analog switches represented by block 22. The number of analog switches used in this embodiment is 40. However, the number of analog switches to be used can be varied. Each of these analog switches feeds a separate channel. Thus in this embodiment the number of channels is limited to 40. The output of amplifier 18 is fed to each of the 40 channels used in a sequential manner determined by a sequence in which the corresponding analog switches are turned on.

Sequential order in which the analog switches represented by block 22 are turned on is provided by a conventional clock 24 which feeds its output to a conventional counter 26. The output of the counter 26 is fed into a conventional shift register 28 which energizes a switch driver in a group of switch drivers represented by block 30 via its corresponding buffer in a group of buffers represented by block 32. The energized switch driver in turn energizes the corresponding analog switch in block 22.

The output of each of the 40 channels in this embodiment is summed at a summing amplifier 34 together with an output of a target represented by block 36. The output of summer 34 is shown by arrow 38 which is amplified by an output stage having an amplifier 40 and having a variable gain and offset. The output of amplifier 40 thus represents the output of channel 1 of multichannel simulator of this invention.

Figure 2:
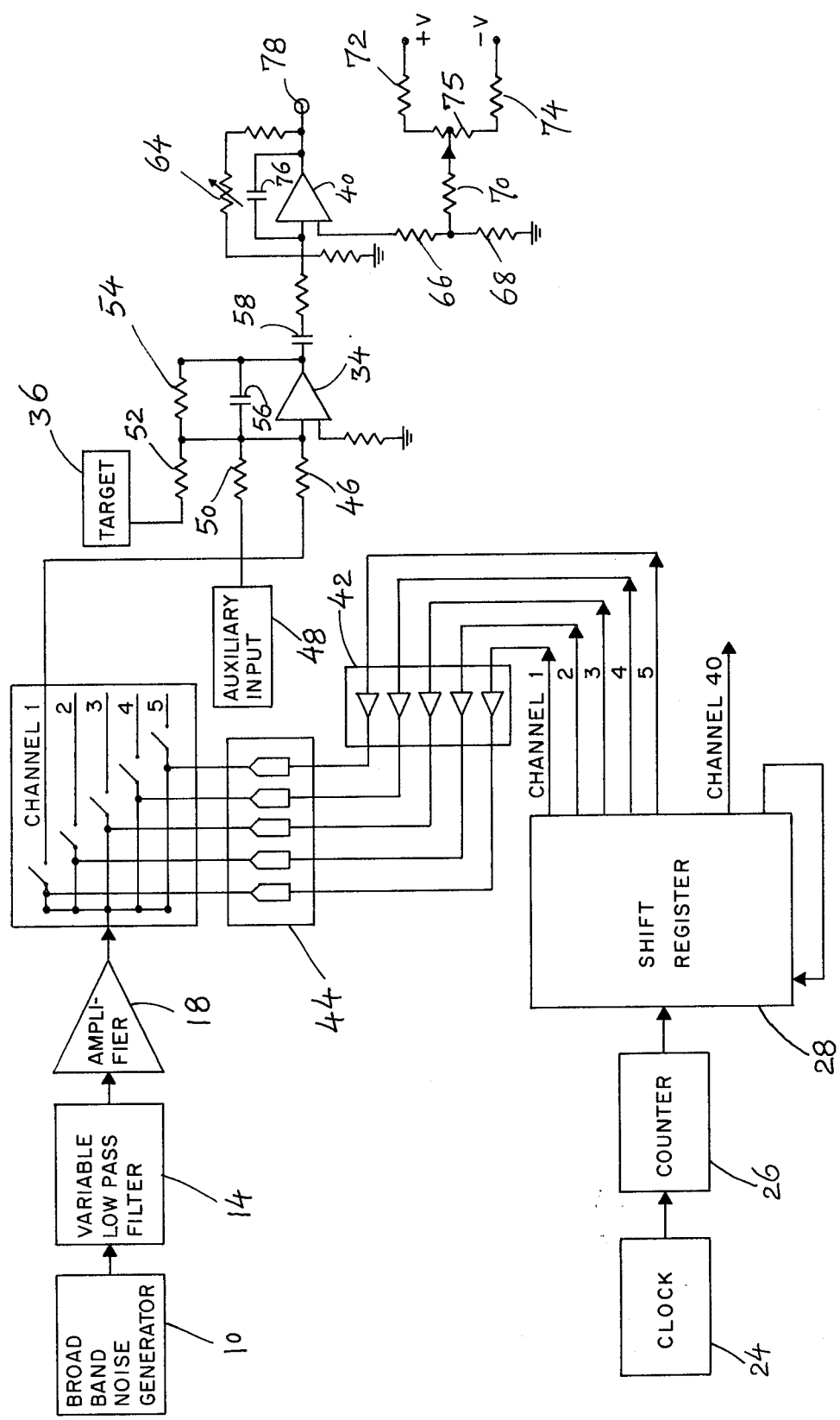
FIG. 2 is a block diagram of a multichannel simulator of the present invention showing schematically the circuit diagram for channel 1, which is a typical representation of the remaining channels of the noise simulator.

FIG. 2 is also a block diagram of an embodiment of the multichannel noise simulator of this invention wherein the electronic circuitry used in channel 1, which is a typical channel of the multichannel simulator, is shown in detail. Broad band noise generator 10 feeds its output to the variable low pass filter represented by block 14, which in turn feeds a 1 MHz broad band amplifier 18. The output of the variable low pass filter provides filtered random noise which is multiplexed into 40 summing amplifiers, such as summer amplifier 34 in channel 1. Noise correlation characteristics between various channels are controlled by the filtering of the random noise by the variable low pass filter represented by block 14.

The analog switches used in this circuit are preferably Field Effect Transistor, hereinafter abbreviated as FET, switches which are momentarily turned on in sequence by a shift register-counter-clock combination. As shown in FIG. 2 a timing pulse from clock 24 goes to each position of shift register 28 through counter 26. The shift register-counter-clock combination is such that the timing pulse is only in one position of the shift resistor at any one time. When the timing pulse reaches the last position in the shift register, the shift register is cleared automatically and is ready to accept another timing pulse from clock 24 through counter 26. FIG. 2 shows diagrammatically in block 42 only 5 of the buffers, one buffer in each of the first 5 channels. Block 44 shows only five of the switch drivers of block 32, one switch driver in each of the first five channels. Thus, there is one buffer and one switch driver in each of the first five channels as shown in FIG. 2. Each of the buffers of block 32 is used to bring the output of the shift register 28 to a level which will trigger the corresponding switch driver of block 30. Each switch driver in return energizes its corresponding FET analog switch and thus feeds the output of amplifier 18 to the corresponding channel. As shown in FIG. 2, when FET switch number 1 is energized, the output of amplifier 18 is fed into its summing amplifier 34 through a resistance 46. An auxiliary output represented by block 48 may also be used as an input to summer amplifier 34 together with an output from a target 36 through resistors 50 and 52 respectively. Resistor 54 is used for feedback to the summer amplifier and capacitor 56 provides required stability in the circuit. The output of summing amplifier 34 in channel 1 is RC coupled through capacitor 58 and resistor 60 to the output stage amplifier 40. The gain and offset of output stage are adjustable by means of resistors 62, 64, 66, 68, 70, 72, 74, 75 and capacitor 76. The output of channel 1 thus appears at point 78. The remaining channels of the multichannel simulator have similar summing and output stage circuitry to that of channel 1, as shown in FIG. 2.

To set the signal-to-noise ratio at the output when using external signal simulators, the noise is shorted out at the broad band amplifier output and the signal level is measured. The 40 signal inputs are then grounded by relays to measure the noise. Then the output level is adjusted with the output gain control of the output stage to the desired level. Channel to channel noise correlation is set by selecting the cut-off frequency of the variable low pass filter following the random broad band noise generator.

Thus a multichannel noise simulator of the present invention comprises a broad band noise generator, the output of which is filtered by a variable low pass filter before it is amplified by a broad band amplifier. The output of the broad band amplifier is fed into a plurality of channels in a sequential order which is provided by a plurality of analog switches. The analog switches are energized in a sequential order provided by a shift register-counter-clock combination. The outputs of various channels are then summed and properly amplified and combined together to get noise pulses that are close to the noise characteristics of an array of hydrophones.

Obviously many modifications and variations of the present invention are possible in the light of above teachings. As an example, sequential order of turning on the analog switches used in this circuit can be provided by a different type of circuit. It is therefore understood that within the scope of the appended claims the invention may be practiced otherwise than as specifically described.

We claim:

1. A multichannel noise simulator comprising:
a random noise generator;
a variable low band pass filter, the output of said noise generator being connected to the input of said low band pass filter;
a wide band amplifier having the input thereof connected to the output of said low band pass filter;
a plurality of switching means in communication with the output of said wide band amplifier;
a plurality of channels, each switching means being connected to a corresponding channel in said plurality of channels;
means for energizing each of said plurality of switching means in a sequential order;
a plurality of auxiliary inputs; and
summing and amplifying means in each of said plurality of channels for summing and amplifying the output of said amplifier with said plurality of auxiliary inputs.

2. The noise simulator of claim 1 wherein the means for energizing each of said plurality of switching means comprises a shift register-counter-clock combination.

3. The noise simulator of claim 2 wherein said shift register-counter-clock combination further includes a plurality of buffer-switch driver sets, there being one buffer-switch driver set corresponding to each of said plurality of switching means.

4. The noise simulator of claim 3 wherein each of said plurality of switching means includes an FET switch.

* * * * *